United States Patent [19]
Dabrio

[11] 4,204,504
[45] May 27, 1980

[54] FUEL HEATING, AIR METERING VALVE UNIT FOR ENGINE AIR INLET SYSTEM

[76] Inventor: John W. Dabrio, 10343 Slater, Apt. 202, Fountain Valley, Calif. 92708

[21] Appl. No.: 906,114

[22] Filed: May 15, 1978

[51] Int. Cl.² .......................................... F02M 31/00
[52] U.S. Cl. .............................. 123/119 B; 123/122 E; 123/122 AB
[58] Field of Search ........ 123/119 B, 122 E, 122 AC, 123/122 AB, 41.86

[56] References Cited
U.S. PATENT DOCUMENTS

| | | | |
|---|---|---|---|
| 1,952,964 | 3/1934 | Baudains | 123/119 B |
| 3,358,661 | 12/1967 | Garner | 123/119 B |
| 3,809,035 | 5/1974 | Winton | 123/119 B |
| 3,923,024 | 12/1975 | Dabrio | 123/119 B |

*Primary Examiner*—Ronald H. Lazarus
*Attorney, Agent, or Firm*—William W. Haefliger

[57] ABSTRACT

Heat is transferred from a stream of engine crankcase gas to a stream of engine fuel, proximate a location where air is metered to the crankcase gas stream, for flow to the engine fuel/air intake.

9 Claims, 3 Drawing Figures

FUEL HEATING, AIR METERING VALVE UNIT FOR ENGINE AIR INLET SYSTEM

BACKGROUND OF THE INVENTION

This invention relates generally to the attainment of better air-fuel mixture ratios in air-fuel streams delivered to internal combustion engine cylinders; more particularly, it concerns the unusually advantageous use of an air metering valve in the crankcase gas recycling path and in the fuel supply path associated with an engine.

It is found that conventional engines normally burn or combust only 50 to 60 per cent of their gasoline supply, due primarily to inadequate metering of air or oxygen to the gasoline feed. As a result, when the mixture is brought up to flash point, there if often insufficient oxygen present to combine with the fuel molecules, so that not all the fuel can burn and release its energy. This deficiency is aggravated by recycling of crankcase gases to the air-fuel stream, as is currently advocated to reduce smog. Also, it is found that the fuel is often incompletely vaporized, which lowers engine efficiency.

SUMMARY OF THE INVENTION

It is a major object of the invention to provide a solution to the above problems, advantage being taken of the recycling of the hot crankcase gas to both air added by metering, and to extract heat from the hot gas for pre-heating the liquid fuel being supplied to the engine air intake. As a result, better fuel vaporization is achieved in conjunction with and in relation to added air pre-mixing with the crankcase gas to achieved significant improvements in engine operating efficiency, as for example decreased fuel consumption requirements. All of this is achieved in a very simple manner, as will appear.

Basically, then, the method of the invention includes the steps:

(a) metering air flow to a stream of hot crankcase gas being returned to the engine air/fuel intake, and (b) passing a stream of liquid fuel in heat transfer relation with said stream of hot crankcase gas to preheat said fuel stream prior to flow thereof to the engine air/fuel intake.

As will appear, an air metering valving unit is typically provided and to which both flows of crankcase gas and fuel are passed for heat transfer therebetween, as referred to.

In its basic application aspects, the invention is embodied in the combination that includes:

(a) an air metering valve unit having first inlet and outlet means for a stream of crankcase gas, (b) said unit having a valve controlled side entrance for air to be metered to said crankcase gas stream, (c) said unit having second inlet and outlet means for a stream of liquid fuel, (d) and said unit including a chamber located in heat transfer relation with said crankcase gas, said chamber connected in series with said second inlet and outlet means to receive said fuel for heat transfer thereto from said crankcase gas.

Further, the chamber may be located below the level of the air entrance, with a partition separating the fuel in the chamber from the hot crankcase gas to which air is being metered via that air entrance; the fuel inlet and outlet may be located out of alignment to promote fuel circulation in the chamber and better heat transfer to the fuel; and the fuel chamber may be defined by a receptacle removably attached to a body which passes the crankcase gas, whereby the fuel chamber may be detached to allow cleaning of the gas passage in the air metering valve unit.

These and other objects and advantages of the invention, as well as the details of an illustrative embodiment, will be more fully understood from the following description and drawings, in which:

DRAWING DESCRIPTION

DETAILED DESCRIPTION

Figure 1:
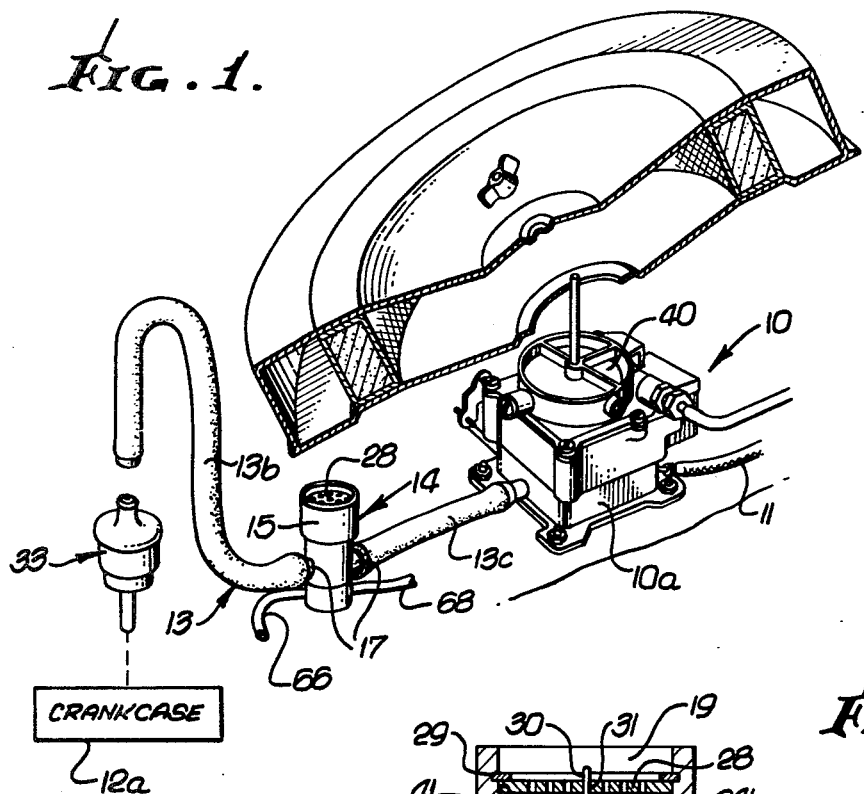
FIG. 1 is a perspective showing of a system incorporating the invention.
Figure 2:
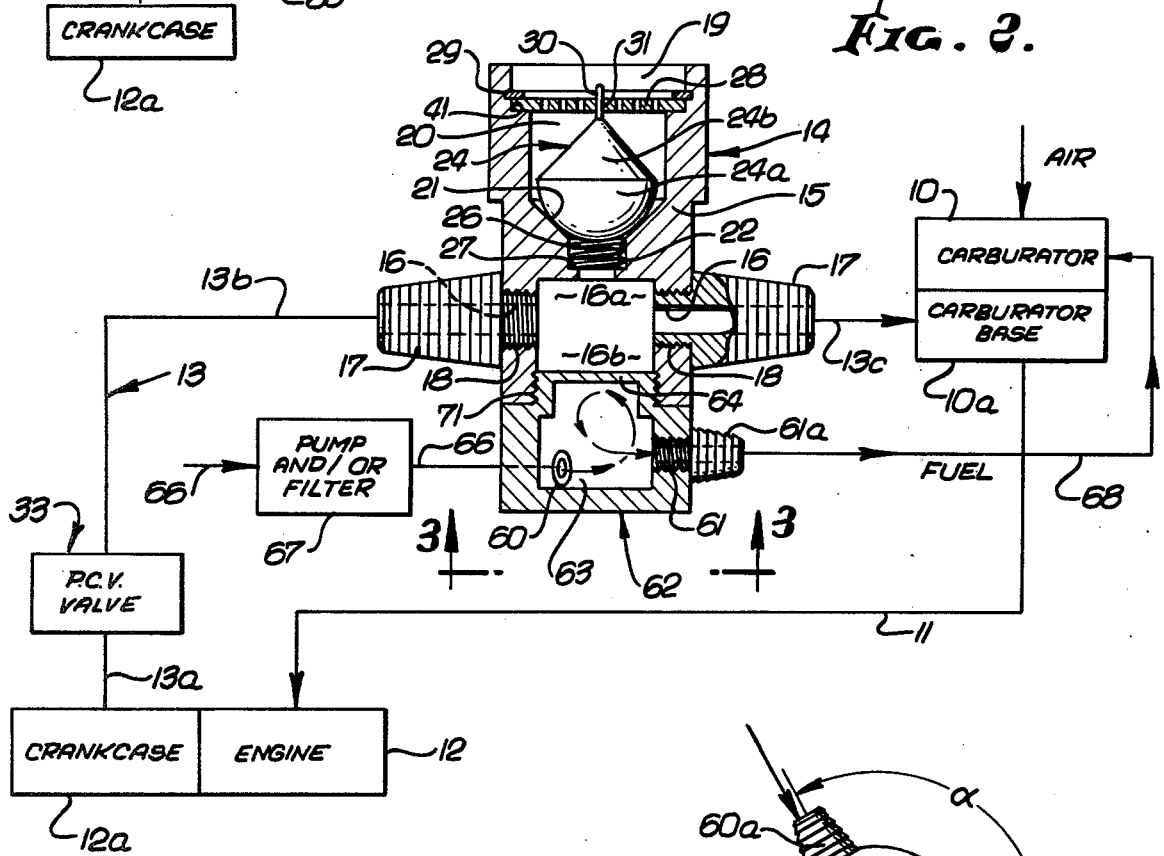
FIG. 2 is a vertical cross section through a unit incorporating the invention.
Figure 3:
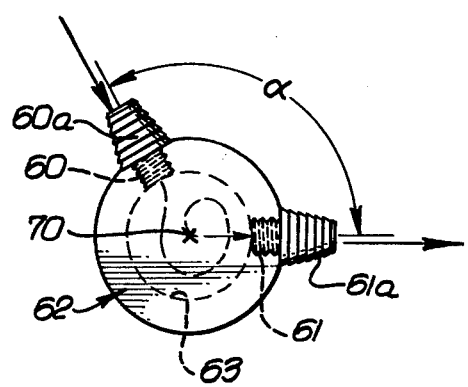
FIG. 3 is a bottom view on lines 3—3 of FIG. 2.

In the drawings, and as described in my U.S. Pat. No. 3,923,024, carburetor 10 conventionally delivers an air-fuel mixture stream via manifold 11 to an internal combustion engine 12. The engine includes a crankcase 12a, and a duct or hose 13 is connected between the crankcase and carburetor base 10a for recycling blowby fumes (crankcase gas) to the air-fuel mixture stream.

An air metering valve unit 14 is operatively connected in series with duct 13. Unit 14 includes an upright body 15 providing a horizontal through passage 16 to pass the crankcase gas flow through the body toward the carburetor. Passage 16 may in part be provided by tubular hose fittings 17 thread connected at 18 to the body, as shown, to receive the ends of duct or hose sections 13b and 13c.

Body 15 also has an air inlet 19 communicating with the passage 16 via an air flow chamber 20. The latter is downwardly tapered to provide an annular, frusto-conical seat at 21, and a flow port 22 communicates between the lowermost extent of the chamber 20 and an enlargement 16a of the passage 16.

Control means is provided and includes a valve element movable in the body 15 in response to relatively decreased suction or vacuum communicated to the valve unit from the fuel-air gas stream to increase air delivery via the inlet 19 to the crankcase gas flow; also, the valve element is movable in response to relatively increased suction communicated the valve unit from the fuel-air stream to decrease air delivery via the inlet to the crankcase gas flow. Relative opening of butterfly valve 40 in the carburetor serves to reduce such suction, and vice versa. Accordingly, at accelertation, at high engine speed and also when the engine is under load such as lugging up a grade, when such suction is reduced, and the air fuel mixture is relatively rich, more air is admitted to the mixture stream via unit 14; conversely, at normal engine speeds when the air fuel mixture is closer to ideal (15 lbs. of air per lb. of fuel) less or no air is admitted via unit 14 to the mixture stream via the crankcase gas return flow, the suction to valve unit 14 being relatively increased. This also occurs at idle.

In the illustrated embodiment, the valve element comprises a stopper 24 movable up and down in the chamber 20, i.e., to annularly engage seat 21 and plug the air inlet in response to increased suction communicated via duct 13c, passage 16 and port 22 to the underside of the stopper. A compression spring 26 in port 22 is shouldered at 27 and urges the stopper in an upward direction away from seat 21 in response to relatively reduced suction communicated to the stopper via the flow port.

It will be noted that the stopper has an annularly convex or hemispherical lower portion 24a to engage the seat, and an upwardly tapering upper portion 24b to be swept by air entering the chamber 20 via inlet 19. Accordingly, the stopper is self-cleaning, in that entering air sweeps it clean of any particulate or other contaminant, so that the seat 21 and surface 24a remain in cleansed condition for effective annular seating to close the valve unit. In this regard, the lowermost portion of the enlargement 16a defines a trap zone 16b below the level of the horizontal through. passage and directly below port 22 to receive and trap any heavy contaminant such as oil in the crankcase gas flow being returned to the air-fuel stream.

A perforated top plate 28 extends across inlet 19 and is carried in counterbore 41 and retained by snap ring 29, to filter larger contaminant from the entering air. A central pin extension 30 on the stopper guides in a central bore 31 in that plate to guide stopper up and down movement in a vertical direction, relative to the seat. Accordingly, removal of plate 28 facilitates removal of the stopper for inspection, whenever desired.

A second metering valve unit 33 (positive crankcase ventilation valve, or PCV valve) is connected in duct 13, i.e., between duct sections 13a and 13b as shown. Unit 33 operates to increase crankcase gas delivery to the fuel-air stream in response to decreased suction communicated from that stream to the unit 33, and to decrease crankcase gas delivering in response to relatively increase suction communication to the unit 33.

Device 14 serves to lean out otherwise rich fuel-air mixtures to a normal mixture of not more than 14 weight parts of air to 1 weight part of fuel.

Stopper 24 is free to seat in slightly differing lateral positions, but it is self-centering, and such lateral movement aids cleansing of seat 21.

In addition to the first inlet and outlet means, as at 17 and 18, for the hot crankcase gas, the unit 14 has second inlet and outlet means for a stream of liquid fuel. Examples of these are shown by fuel inlet 60 and outlet 61, suitable fittings 60a and 61a to receptacle 62 being provided for this purpose. The receptacle defines a chamber 63 located in heat transfer relation with the crankcase gas in paspage enlargement 16a and trap zone 16b. For example. a partition 64 separates enlargement 16a and zone 16b from chamber 63. Accordingly, heat from the crankcase gas circulating in or flowing through 16a and 16b is transferred via thin metal partition 64 to liquid fuel in chamber 63 and passing between fuel inlet 60 and outlet 61, to heat the fuel for enhancing its ultimate vaporization in the carburetor. Note fuel duct 66 connected to inlet 60 (and in series with fuel pump and/or filter structure 67), and fuel duct 68 leading to the carburetor 10 (as via jets, not shown).

To enhance the heat transfer, the fuel is caused to circulate in chamber 63. This is effected by locating inlet 60 and outlet 61 out of alignment, as for example, at an angle $\alpha$ of less than 180° relative to the axis 70 of cylindrical wall receptacles 62; also outlet 61 is at a slightly higher elevation than inlet 60. Finally, air entering via the side entrance tends to deflect the hot gas toward partition 64, to enhance heat transfer.

Receptacle 62 may be advantageously thread connected at 71 to the body 15, so that partition 64 closes the bottom of the enlargement 16a. This also allows removal of the receptacle to permit access to and cleaning of the trap 16b and enlargement 16a directly below the valve 24.

In operation, fuel is pre-heated in chamber 63, and tests show that up to 25% fuel savings may be achieved through use of the unit as described.

I claim:

1. In a system to supply liquid fuel, crankcase gas, and air to the fuel/air intake of an internal combustion engine, wherein the improvement combination comprises
   (a) an air metering valve unit having first inlet and outlet means for a stream of hot crankcase gas,
   (b) said unit having a valve controlled side entrance for air to be metered to said crankcase gas stream,
   (c) said unit having second inlet and outlet means for a stream of fluid fuel,
   (d) and said unit including a chamber located in heat transfer relation with said crankcase gas, said chamber connected in series with said second inlet and outlet means to receive said fuel for heat transfer thereto from said crankcase gas, said unit including a partition separating the fuel stream in said chamber from the hot crankcase gas stream in said unit, said side entrance located in such air directing alignment with said partition as to cause the entering air flow to deflect the hot gas stream toward the partition to enhance said heat transfer.

2. The combination of claim 1 wherein said chamber is located directly below, said air entrance.

3. The combination of claim 2 wherein said second inlet means is located out of alignment from said second outlet means to cause circulation of the fuel stream in said chamber toward said partition.

4. The combination of claim 3 wherein said chamber is defined by a generally cylindrical receptacle having a wall at which said second inlet and outlet means are located, said second inlet and outlet means spaced at less than 180° about an axis defined by said cylindrical receptacle.

5. The combination of claim 3 wherein said chamber is defined by a receptacle having a wall at which said second outlet means is located at a higher level than said second inlet means.

6. The combination of claim 5 wherein said unit includes a body providing a through passage to pass the crankcase gas flow through the body, said receptacle removably attached to said body.

7. The combination of claim 6 including:
   (i) control means including a valve element movable in the body at a location above the receptacle, and in response to relatively decreased suction communicated to the first outlet means to increase air delivery via said air entrance to said crankcase gaseous flow, and also movable in response to relatively increased suction communicated to said first outlet means to decrease air delivery via said entrance to said crankcase gaseous flow,
   (ii) said valve element located above said chamber.

8. The combination of claim 6 wherein said body defines an air flow chamber there being an annular seat in said chamber, the valve element comprising a stopper movable in the chamber to annularly engage said seat in response to said increased suction communication to said stopper, said chamber including a flow port communicating between said through passage and said stopper, there being a compression spring in said flow port for urging the stopper in a direction away from the seat in response to said relatively decreased suction communication to the stopper via said flow port, the stopper having an annularly convex lower portion to engage the seat, and an upwardly tapering, cone shaped upper portion to be swept by air entering the chamber via said inlet, the chamber extending upright above the level of said through passage.

9. The combination of claim 1 including a first duct connected with said first inlet and outlet means to deliver the crankcase gas flow to the engine carburetor, and a second duct connected with the second inlet and outlet means to deliver the fuel flow to the engine carburetor.

* * * * *